(12) United States Patent
Felix et al.

(10) Patent No.: US 7,720,361 B2
(45) Date of Patent: May 18, 2010

(54) METHOD AND APPARATUS FOR MAINTAINING CONDENSABLE CONSTITUENTS OF A GAS IN A VAPOR PHASE DURING SAMPLE TRANSPORT

(75) Inventors: Larry Gordon Felix, Pelham, AL (US); William Earl Farthing, Pinson, AL (US); James Hodges Irvin, Westover, AL (US); Todd Robert Snyder, Birmingham, AL (US)

(73) Assignee: Gas Technology Institute, Des Plaines, IL (US)

( * ) Notice: Subject to any disclaimer, the term of this patent is extended or adjusted under 35 U.S.C. 154(b) by 680 days.

(21) Appl. No.: 11/544,969

(22) Filed: Oct. 6, 2006

(65) Prior Publication Data

US 2008/0085220 A1  Apr. 10, 2008

(51) Int. Cl.
*A61M 16/00* (2006.01)

(52) U.S. Cl. ...................................................... 392/437

(58) Field of Classification Search .................. 392/473, 392/474, 475, 476, 477; 137/334–341; 219/214; 222/146.1–146.6; 239/128–139; 604/113–114
See application file for complete search history.

(56) References Cited

U.S. PATENT DOCUMENTS

| | | | | |
|---|---|---|---|---|
| 4,513,572 A | * | 4/1985 | Bonnaud | 60/618 |
| 5,441,365 A | * | 8/1995 | Duffney et al. | 405/128.4 |
| 2006/0123830 A1 | * | 6/2006 | Dietschi et al. | 62/389 |
| 2007/0101717 A1 | * | 5/2007 | Beaulieu | 60/645 |

* cited by examiner

*Primary Examiner*—Daniel Robinson

(57) ABSTRACT

A system for fluid transport at elevated temperatures having a conduit having a fluid inlet end and a fluid outlet end and at least one heating element disposed within the conduit providing direct heating of a fluid flowing through the conduit. The system is particularly suited for preventing condensable constituents of a high temperature fluid from condensing out of the fluid prior to analysis of the fluid. In addition, operation of the system so as to prevent the condensable constituents from condensing out of the fluid surprisingly does not alter the composition of the fluid.

4 Claims, 2 Drawing Sheets

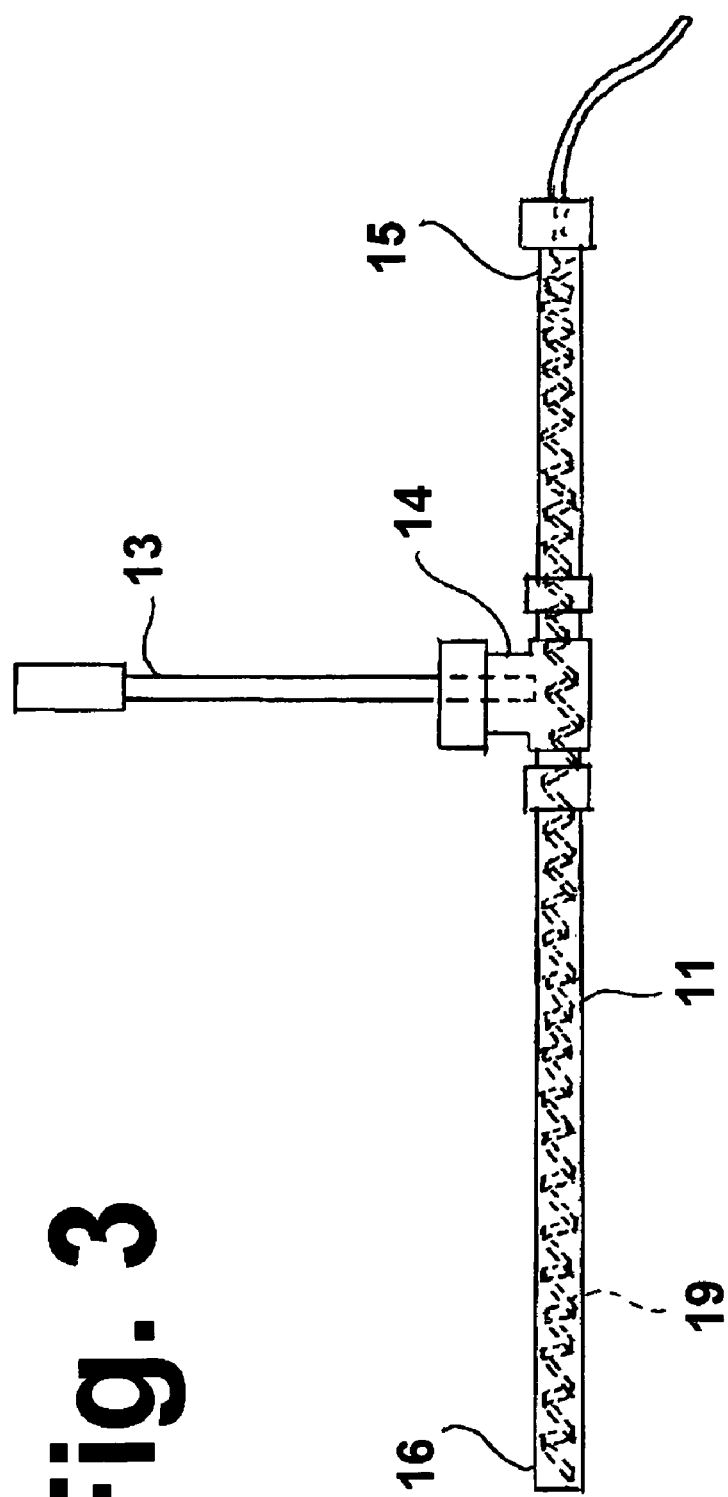
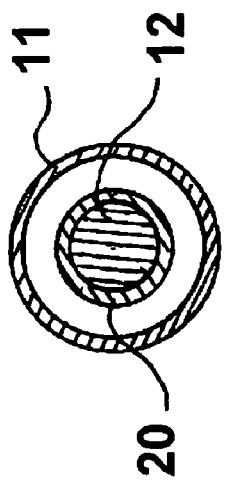

METHOD AND APPARATUS FOR MAINTAINING CONDENSABLE CONSTITUENTS OF A GAS IN A VAPOR PHASE DURING SAMPLE TRANSPORT

The U.S. Government has a paid-up license in this invention and the right in limited circumstances to require the patent owner to license others on reasonable terms as provided for by the terms of Contract No. DE-FC36-03G013175 awarded by the U.S. Department of Energy.

BACKGROUND OF THE INVENTION

1. Field of the Invention

This invention relates to a method and apparatus for transporting fluids at elevated temperatures. More particularly, this invention relates to a method and apparatus for transporting non-inert gaseous fluids or mixtures of inert and non-inert gaseous fluids at elevated temperatures so as to maintain condensable constituents of the non-inert gaseous fluids in a vapor phase during transport.

2. Description of Related Art

When gas is extracted from high temperature processes and conveyed, for example, to a suite of analyzers, it is of great importance that condensation and reaction of any portion of the gas be avoided before it is analyzed. Condensation can be avoided by appropriate dilution with an inert, hot gas, to reduce the concentration of the condensable component, combined with transport through heated, inert tubing. In situations where dilution is impractical, such as when the concentration of trace pollutants of interest, e.g. $H_2S$, COS, or very heavy hydrocarbons such as coronene, end up being below the limit of instrumentation detection, dilution cannot be employed, requiring that the inerted sample lines be maintained as hot as possible.

Sample lines are typically heated by intimate contact with an external sheathed heating element, e.g. heat tracing from about 5/16 in. to about 3/8 in. diameter in lengths of about 80 feet, that has been formed or bent to conform to the sample line and flanges and wired in place, liberally coated with heat-setting, thermally conductive cement and wrapped with heat-resistant foil tape. Thermocouples are usually located near the heaters, typically within the layer of thermally conductive cement, and within the sample line, such as at a "tee" connection, for heater control and measurement of gas temperature. To limit heat loss, external blankets of temperature-resistant insulation are wrapped around the sample transport line and heaters after which the insulation is covered with standard lagging materials that are secured in place. Heater replacement involves removal of all external insulation and insulation lagging, removal of thermocouples, hardened thermal cement, and the foil covering, and uncoiling of the old heater, followed by reinstallation of a new heater element, reapplication of thermal cement, reattachment of the thermocouples, wrapping the assembly with foil tape, and, finally, application and securing of new insulation, if needed, and exterior lagging. Clearly, replacing external heaters that have failed is a labor-intensive process.

In environments that are not intrinsically safe, the surface temperature of external heat tracing and cable heaters cannot exceed about 950° F., the auto-ignition temperature of hydrogen in air. When the energy losses inherent to this approach to heating are taken into account, gas passing through externally heated sample transport lines, connectors, and joints cannot be reliably maintained at more than about 500° F., which is high enough to safely transport acid gases such as HCl or $H_2S$, but not high enough to transport heavy hydrocarbon compounds such as pyrene and coronene. Over time, heavy hydrocarbons accumulated within the sample lines can react, introducing sampling errors, and eventually affecting sample transport. It should be noted that a typical figure for the concentration of hydrocarbon tars (MW≧78) in synthesis gas produced from fluidized-bed biomass gasification is about 10 g/Nm$^3$. Thus, high levels of dilution and/or very high sample gas temperatures may be required to avoid condensation while transporting the synthesis gas to analysis equipment located in a remote, intrinsically safe area.

A further consideration is the efficiency of conventional systems. As previously indicated, current technology employs external heat tracing that is manually wrapped around the sample lines used to convey the sample gas. Because external heaters are employed, even with proper heat insulation and the use of thermally-conductive cements, according to heat tracing manufacturer's representatives, up to about 38% of the heat energy available from these heaters escapes directly to the environment.

In addition to the above-enumerated considerations, external heating is commonly applied to transport tubing that carries inert dilution gas and gas mixtures that are used for calibration and spiking—that is, gases that are injected into a sampling system near the sample extraction point of a process so that in its path to an analyzer, the calibration or spike gas experiences the same environment as that experienced by the sample of gas extracted from the process. Internal tube heaters are known, but only for use in connection with inert fluids. These heaters are essentially coils of nichrome wire or coiled cable heaters that are insulated, e.g. in a quartz tube, and housed within a short section of metal piping in which gas is flowing, maintained at a very high temperature. Usually, these heaters are located very near to the point of use because they are intended only to provide extreme, localized heat.

SUMMARY OF THE INVENTION

It is, thus, one object of this invention to provide a system for non-inert fluid transport at elevated temperatures which is capable of maintaining condensable constituents in the fluid in a vapor phase during transport through the system.

It is another object of this invention to provide a system for non-inert fluid transport at elevated temperatures which is suitable for use in environments that are not intrinsically safe.

It is yet a further object of this invention to provide a system for non-inert fluid transport at elevated temperatures which is easily replaceable compared to conventional fluid transport heating systems.

It is still another object of this invention to provide a system for non-inert fluid transport at elevated temperatures which is higher in efficiency than conventional fluid transport heating systems.

These and other objects of this invention are addressed by a system for non-inert fluid transport at elevated temperatures comprising a conduit having a fluid inlet end and a fluid outlet end in which is disposed at least one heating element providing direct heating of a non-inert fluid flowing through the conduit. As used herein, the term "heating element" refers to a component of a heating system which transforms fuel or electricity into heat energy. Exemplary of such a heating element is an electric cable heater. As used herein, the term "inert" describes fluids or other materials that are substantially non-reactive. Examples of such fluids include the noble gases—He, Ne, Ar, Kr, Xe, and Rn. As used herein, the term "non-inert" describes fluids and other materials that are generally reactive or, in the presence of oxygen, kept below pertinent reaction or autoignition temperatures. Examples of such fluids include $O_2$, $N_2$, CO, $CH_2$, and $H_2$. As used herein, the term "elevated temperature" refers to temperatures greater than room temperature.

This invention provides much more effective heating of gases and other fluids conveyed through externally insulated sample lines than conventional systems by relocating the large heater from the outside of the sample line (heat tracing) to the inside of the sample line (as a smaller cable heater) where intimate gas-heater contact with a smaller heater is assured and heat is much more effectively transmitted to the gas. These smaller heaters are cheaper than large, longer external heat tracing, and because essentially all of their heat is transmitted to the gas flowing around the heating element, less power is required to transport a given quantity of gas at a desired temperature. By virtue of superior heat conduction compared to conventional systems, the upper effective range of heating for gas sampling is extended so that gases withdrawn from industrial processes at temperatures up to about 1100° F. can be maintained at those temperatures, in a diluted or undiluted state, while being transported to gas analysis equipment. As long as oxidation is avoided, the composition of the non-inert fluid remains unchanged as it flows through the sample transport conduit.

BRIEF DESCRIPTION OF THE DRAWINGS

These and other objects and features of this invention will be better understood from the following detailed description taken in conjunction with the drawings, wherein:

FIG. 2 is a lateral cross-sectional view of a system for fluid transport at elevated temperatures in accordance with one embodiment of this invention; and FIG. 3 is a transverse cross-sectional view of a system for fluid transport at elevated temperatures in accordance with one embodiment of this invention.

DETAILED DESCRIPTION OF THE PRESENTLY PREFERRED EMBODIMENTS

Figure 1:
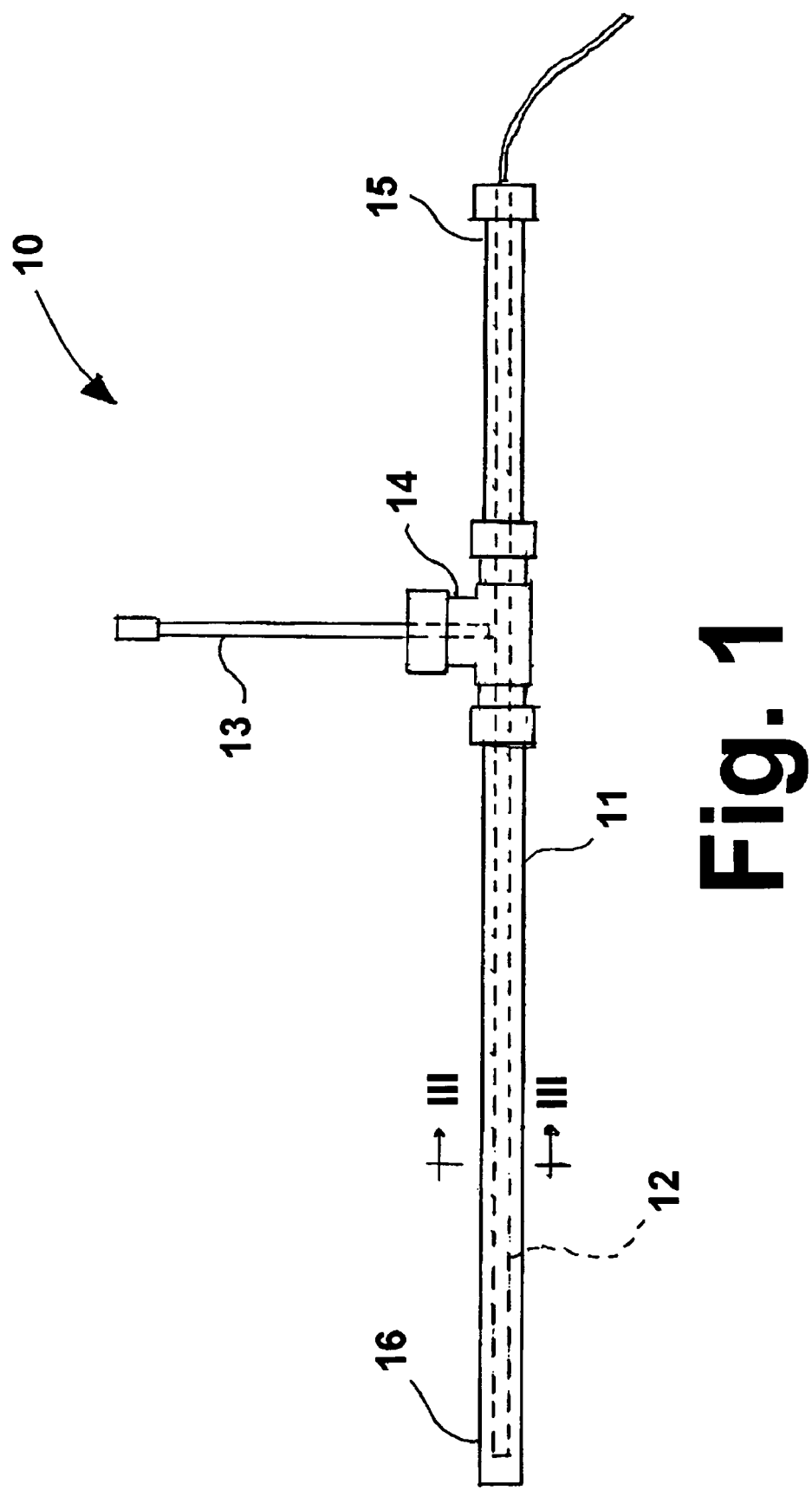
FIG. 1 is a lateral view of a system for fluid transport at elevated temperatures in accordance with one embodiment of this invention.

One object of this invention is to remove the limitations imposed by conventional external heat tracing of sample transport tubes by locating suitably-sized heating elements or cable heaters within the sample transport tubes. FIG. 1 shows a system 10 for fluid transport of heated fluids in accordance with one embodiment of this invention comprising a sample tube or conduit 11 having a fluid inlet end 15 and a fluid outlet end 16. Heating element 12 is disposed within conduit 11. To provide for temperature control of the system, conduit 11 includes a "tee" fitting 14 into which a thermocouple 13 or other similar temperature measurement device is inserted.

Although described herein in the context of synthesis gas transport from a process vessel in which the synthesis gas is generated to an analytical system for analyzing the synthesis gas, it will be understood by those skilled in the art that the system of this invention is suitable for use in any situation in which it is desired to prevent condensable constituents of a fluid flowing through a conduit for extended distances from condensing out of the fluid, and such applications are deemed to be within the scope of this invention.

Due to the potential for corrosion from gases flowing through the system of this invention, the sample transport conduits are preferably made from 316L or 310 stainless steel. The sample transport conduits are sized to receive a heating element employed in the system. By way of example, sample transport conduits having an outside diameter in the range of about 0.375 inches to about 0.5 inches are generally large enough to accommodate cylindrical heating elements having a diameter in the range of about 0.0625 inches to about 0.125 inches. These cylindrical heating elements are available in lengths up to about 200 inches; they can be daisy-chained for longer sample transport conduit runs; and they are easily formed into bends and coils 19 as shown in FIG. 2. These heating elements are capable of continuous operation at temperatures as high as about 1200° F. so that gas passing in the vicinity of such a heating element can be maintained at a temperature that is high enough to avoid condensation of condensable constituents in the gas, even when dilution is not employed. For example, when these heaters are located within a sample transport conduit, synthesis gas, which contains no oxygen, can be safely transported without the prospect of auto-ignition. As with external heaters, the exterior of the sample transport conduit cannot be allowed to exceed the auto-ignition temperature of hydrogen in air to remain intrinsically safe, but because the heater elements are disposed within the sample transport conduit, the fluid flowing through the conduit is able to be maintained at a higher temperature without exceeding the auto-ignition temperature of hydrogen in air on the exterior surface of the conduit than fluid being heated by external heaters.

As shown in FIG. 3, the heating elements 12 employed in accordance with one embodiment of the system of this invention are disposed within a sheath 20. These external sheaths are preferably made from heat resistant alloys. In accordance with one embodiment of this invention, the external sheaths are coated with an inert compound such as that used to passivate sample transport conduits, e.g. RESTEK SIL-COSTEEL® silica coating. The coating may be applied directly to the heater element sheath. If this is not feasible, lengths of thin capillary tubing made from a compatible heat-resistant alloy sized just large enough to slip over the heater element can be given a coating and slid over the heater element before it is inserted into the sample transport conduit.

It will be readily apparent that replacement of an internal heating element employed in the system of this invention is neither a labor-intensive nor complicated process compared to conventional external heating systems as discussed herein above because the heater elements can be accessed at the ends of the conduit runs by opening the end of a resealable connection, e.g. a typical fitting available from SWAGELOK®, where the unheated end of the internal heater element emerges, removing the inoperable heating element, inserting a new, sheathed heating element, resealing the resealable connection, and reestablishing the electrical connections with the heating element. In contrast to conventional systems, no layers of insulation need to be replaced and, because thermal cements are not used, thermocouples that control the heater and sense the temperature of the sample gas are not disturbed. Thus, once the heating element is replaced, testing of sample gases can resume.

In accordance with one embodiment of this invention, the heating elements and/or the interior surfaces of the sample transport conduit are passivated. Passivation in accordance with one embodiment of this invention may be achieved using the Restek SILCOSTEEL process of Restek Corporation, State College, Pa. Because virtually all of the surfaces of the system of this invention exposed to process gases can be passivated, the effective transport of virtually every component of the process gas is assured. Process gases from very high temperature processes can be diluted with an appropriate inert gas and transported at 1100° F. or lower as required for analysis or disposal. The dilution gases may also be preheated with internal heating elements appropriately located within the dilution gas transport lines. Sample and dilution gas lines are typically sealed so that gas samples may be transported under pressure or at lower than atmospheric pressure as required or according to the margins of safe operation established for process pressure and temperature. Appropriate lengths of passivated conduit and inerted heating elements may be pre-assembled off-site into modular sections that can be carried to a job site for quick installation, connection, and insulation by any individual with a moderate degree of technical competence. Because these heating elements can be sectionalized, they can be made up in convenient sections ahead of time and stocked as new equipment or as replacement units.

Although intended for application to the transport of hot streams of process gas for eventual analysis, the system of this invention may also be employed in the transport of hot granulated solids or liquids so long as they can be transported through internally heated tubes or pipes by gravity, pulsating or steady pressure, or agitation. In this embodiment, the effect of adding heated dilution gas would be to cause or improve transport. However, precautions must be taken when the system is employed in oxidizing environments where excess heating can cause combustion or other undesirable chemical reactions.

We have tested the system of this invention for efficacy. In one test, internally-heated sample conduits were maintained at 800° F. and undiluted synthesis gas was transported through the sample transport conduits for three days. After the test, the conduits and heating elements were inspected and found to be devoid of any coking or deposition in spite of the fact that the synthesis gas was derived from the gasification of biomass which is known to have relatively high amounts of tars.

The heating elements employed in the system of this invention were also used to replace external heaters within spool pieces and parts of a sample extraction and dilution interface. The heating elements were sheathed with passivated capillary tubing and formed into coils that were inserted into areas of the interface that would have been difficult to heat with externally wrapped cable heating elements. With internal heating, the heating elements were never required to operate at full power to maintain internal temperatures greater than 800° F.

In another test, synthesis gas at 22 bar was extracted and sent to the sample extraction and dilution interface for depressurization and dilution. The heating elements were used to maintain the pressurized synthesis gas at about 850° F. before it was depressurized. The heating elements were never required to operate at greater than 12-15% of their rated capacity to maintain the sampling equipment and synthesis gas at 850° F.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A method for transporting a non-inert fluid at elevated temperature comprising the steps of:
    introducing a non-inert fluid through an inlet opening of a fluid transport conduit into said fluid transport conduit; and
    heating said non-inert fluid to a temperature suitable for maintaining constituents of said non-inert fluid in a vapor phase using a heating element disposed within an interior of said fluid transport conduit.

2. A method in accordance with claim 1, wherein said non-inert fluid is a synthesis gas.

3. A method in accordance with claim 1, wherein said heating element is passivated.

4. A method in accordance with claim 1, wherein an interior surface of said fluid transport conduit is passivated.

* * * * *